US005969320A

United States Patent [19]

Leeper et al.

[11] Patent Number: 5,969,320

[45] Date of Patent: Oct. 19, 1999

[54] KEYBOARD

[75] Inventors: Kevin G. Leeper, Angus; Kenneth Kelly, Dundee, both of United Kingdom

[73] Assignee: NCR Corporation, Dayton, Ohio

[21] Appl. No.: 09/114,085

[22] Filed: Jul. 10, 1998

[30] Foreign Application Priority Data

Aug. 29, 1997 [GB] United Kingdom ................... 9718232

[51] Int. Cl.[6] ................................................ G06K 5/00

[52] U.S. Cl. .......................... 235/380; 235/375; 200/5 A; 200/5 B; 340/407.1; 340/407.2

[58] Field of Search .................................... 235/380, 375; 200/5 A, 5 B; 340/407.1, 407.2

[56] References Cited

U.S. PATENT DOCUMENTS

| | | | |
|---|---|---|---|
| 3,657,492 | 4/1972 | Arndt et al. | 200/5 |
| 3,860,771 | 1/1975 | Lynn et al. | 200/5 |
| 4,017,697 | 4/1977 | Larson | 200/5 |
| 4,046,975 | 9/1977 | Seeger, Jr. | 200/5 |
| 4,352,968 | 10/1982 | Pounds | 200/302 |
| 4,391,845 | 7/1983 | Denley | 427/282 |
| 4,396,830 | 8/1983 | Isozaki et al. | 235/145 |
| 4,421,958 | 12/1983 | Kameda | 200/5 |
| 4,421,966 | 12/1983 | Pounds | 200/309 |
| 4,456,798 | 6/1984 | Iwai et al. | 200/5 |
| 4,490,587 | 12/1984 | Miller et al. | 200/5 |
| 4,501,936 | 2/1985 | Morse | 179/184 |
| 4,919,563 | 4/1990 | Stice | 404/6 |
| 5,132,496 | 7/1992 | Lee | 200/5 |
| 5,218,177 | 6/1993 | Coleman, III et al. | 200/5 |
| 5,481,464 | 1/1996 | Ramsden | 364/464.03 |

*Primary Examiner*—Thien M. Le
*Assistant Examiner*—Daniel Felten
*Attorney, Agent, or Firm*—Gregory A. Welte

[57] ABSTRACT

A keyboard includes a keyboard membrane where the membrane comprises a top layer, a spacer layer and a bottom layer. The spacer layer has interconnecting voids that are connected to the atmosphere by a common vent. A patch made of a hydrophobic material prevents water entering the keyboard membrane via the vent, but allows the air pressure inside the voids to remain balanced with the atmospheric air pressure.

11 Claims, 3 Drawing Sheets

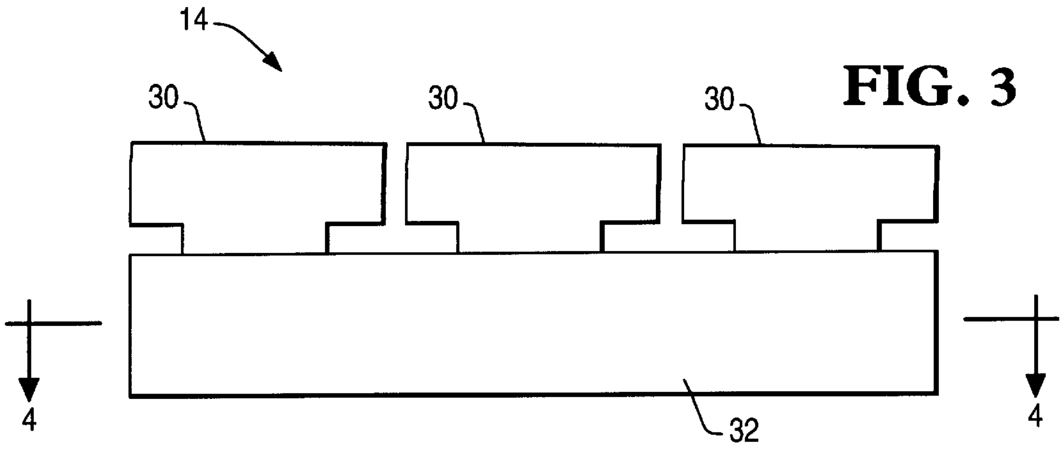
FIG. 3
FIG. 4
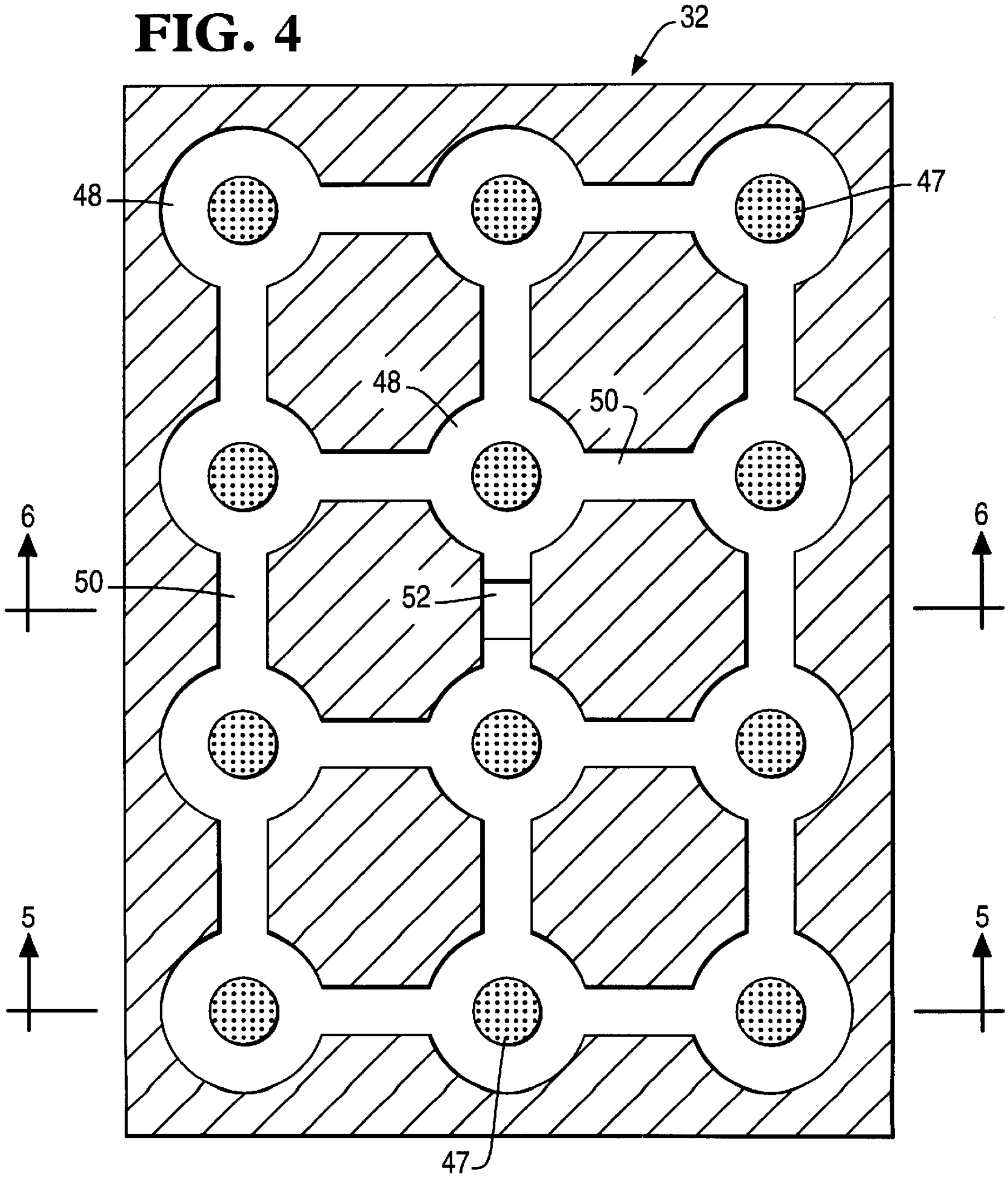

KEYBOARD

BACKGROUND OF THE INVENTION

The present invention relates to a keyboard such as that included in a self-service terminal, such as an automated teller machine (ATM).

The keyboard of a self-service terminal may comprise a matrix of mechanically operable keys supported by a keyboard membrane below. The keyboard membrane contains a void that is connected to the air outside the membrane by a vent. The keyboard can be exposed to rain if the terminal is located outside. Water may thus seep between the keys and into the keyboard membrane below via the vent, damaging the membrane.

What is needed therefore is a keyboard which is more resistant to damage by water.

SUMMARY OF THE INVENTION

In accordance with the present invention, there is provided a keyboard comprising an array of movable keys. Adjacent the keys is a flexible membrane layer comprising first and second outer layers separated by an inner layer having a multiplicity of interconnected voids. An array of switches corresponds to the moveable keys, where movement of a key causes the operation of a corresponding switch and causes expulsion of air from within the membrane layer. A venting aperture connects the inner layer of the membrane layer to the atmosphere, and a liquid resistant gas permeable layer is arranged to cover the venting aperture.

BRIEF DESCRIPTION OF THE DRAWINGS

FIG. 3 is a side elevational view of a keyboard included in the ATM of FIG. 1;

FIG. 4 is a plan sectional view taken along the line 4—4 through the keyboard membrane of the keyboard of FIG. 3;

DETAILED DESCRIPTION OF A PREFERRED EMBODIMENT

Figure 1:
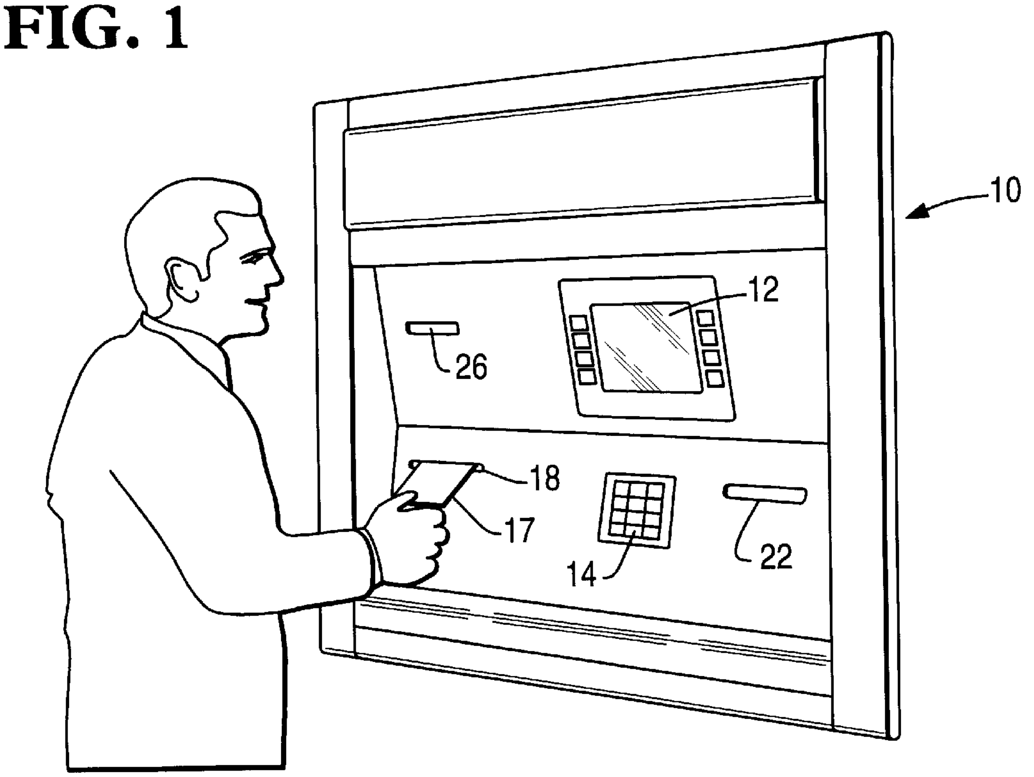
FIG. 1 is a perspective view of an ATM in accordance with the invention.

While the invention is susceptible to various modifications and alternative forms, a specific embodiment thereof has been shown by way of example in the drawings and will herein be described in detail. It should be understood, however, that there is no intent to limit the invention to the particular form disclosed, but on the contrary, the intention is to cover all modifications, equivalents, and alternatives falling within the spirit and scope of the invention as defined by the appended claims.

Figure 2:
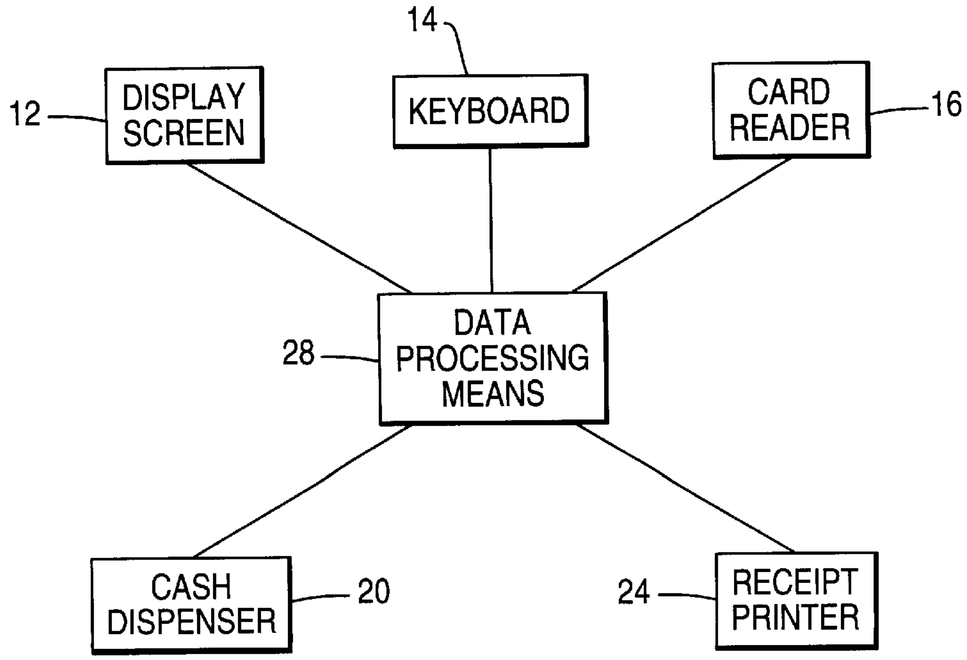
FIG. 2 is a block diagram of the ATM of FIG. 1.

Referring to FIGS. 1 and 2, the ATM 10 shown therein includes a display screen 12 for displaying user information, a keyboard 14 for inputting data, a card reader 16 for receiving a user identity card 17 via a card slot 18, a cash dispenser 20 where currency notes stored in the dispenser 20 are delivered to a user during a transaction via a slot 22, a receipt printer 24 for printing a receipt acknowledging a transaction made by a user and for issuing the receipt to the user via a slot 26, and data processing means 28 to which the screen 12, the keyboard 14, the card reader 16, the cash dispenser 20 and the receipt printer 24 are connected.

Referring additionally to FIG. 3, the keyboard 14 comprises a 3×4 matrix of mechanically operable keys 30 supported by a keyboard membrane 32 below. When a key 30 is pressed, a switch (to be described later) inside the membrane 32 is activated, indicating to the data processing means 28 that that key 30 has been pressed.

Figure 5:
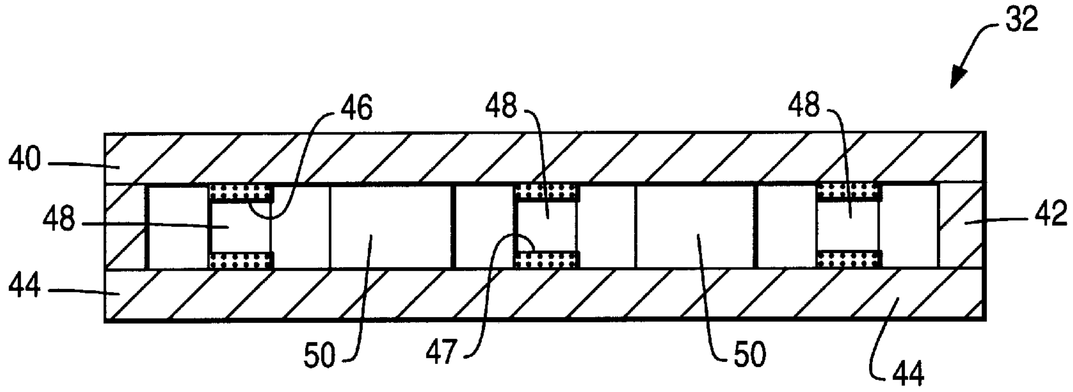
FIG. 5 is a sectional view taken along the line 5—5 of FIG. 4.
Figure 6:
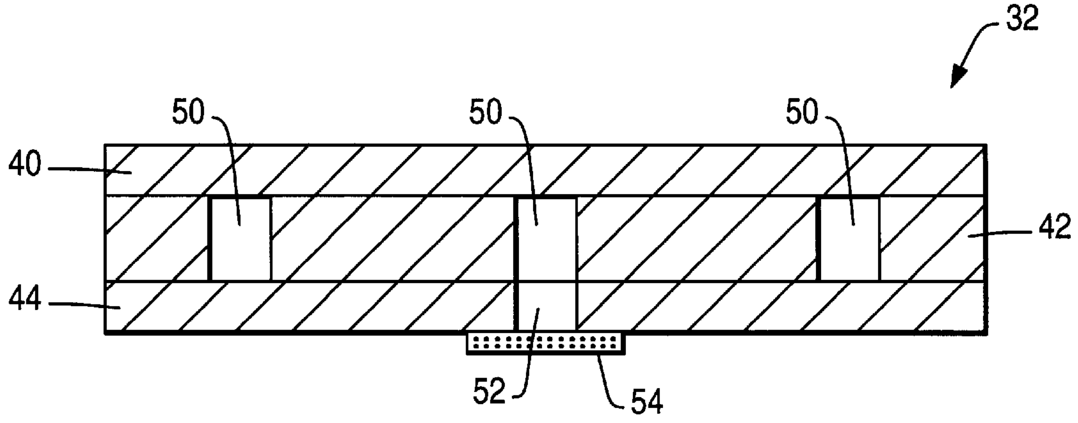
FIG. 6 is a sectional view taken along the line 6—6 of FIG. 4.

Referring to FIGS. 4, 5 and 6, the keyboard membrane 32 comprises a top layer 40, a spacer layer 42 and a bottom layer 44. The top layer 40 and bottom layer 44 are circuit layers that are insulated from each other by the spacer layer 42. Each circuit layer comprises a non-conductive sheet having a conductor pattern disposed on one surface. Below each key 30 there is a normally open switch. The switch comprises a silver ink area 46 that forms part of the conductor pattern on the underside of the top layer 40 and a silver ink area 47 that forms part of the conductor pattern on the topside of the bottom layer 44 with a void 48 filled with air in between. When a key is pressed, the silver ink area 46 on the top layer 40 connects with the silver ink area 47 on the bottom layer 44 closing the normally open switch. The silver ink areas 46,47 of the conductor patterns are part of a monitoring circuit (not shown) of known construction which identifies the pressed key and passes an appropriate signal to the data processing means 28 (see FIG. 2). All the voids 48 are interconnected by channels 50 in the spacer layer 42. Note that the top layer 40, the bottom layer 44 and the solid parts of the spacer layer 42 are shown hatched. A vent hole 52 through the bottom layer 44 provides venting of the voids 48 with the atmosphere. The three layers 40,42,44 are glued together.

A patch 54 covers the bottom of the vent hole 52. This patch 54 is made of a gas permeable hydrophobic material such as "Goretex" (™) which prevents water penetration but allows air to pass through. "Goretex" (™) is available from W. L. Gore and Associates UK Limited, Livingston, West Lothian, Scotland.

Thus, the air pressure inside the voids 48 and outside the keyboard membrane 30 is kept balanced. If the membrane 30 was completely sealed to prevent water penetration, changes in atmospheric pressure could cause the switches to close due to an imbalance in pressure.

Conventional keyboard membranes have been vented to the atmosphere from the side of the keyboard membrane and have thus been susceptible to water penetration via the gaps between the keys above. The invention overcomes this disadvantage since the patch prevents water entering the membrane.

What is claimed is:

1. A keyboard comprising:

an array of movable keys;

a flexible membrane layer adjacent the keys, the flexible membrane including first and second outer layers separated by an inner layer having a multiplicity of interconnected voids;

means defining a venting aperture through which air in the interconnected voids of the inner layer can be vented to the atmosphere;

an array of operable switches corresponding to the array of movable keys such that movement of a key operates a corresponding switch which results in passing of air from the interconnected voids through the venting aperture to the atmosphere; and a liquid resistant gas permeable layer overlying the venting aperture and for (i) preventing liquid from entering through the venting aperture to the interconnected voids of the inner layer, and (ii) allowing air to pass from the interconnected voids through the venting aperture to the atmosphere when a switch operates in response to movement of the corresponding key.

2. A keyboard according to claim 1, wherein the liquid resistant gas permeable layer comprises a hydrophobic material.

3. A keyboard according to claim 1, wherein each switch includes a contact area on the first outer layer and a contact area on the second outer layer, the contact areas on the first and second outer layers making contact when the key corresponding to the switch is pressed.

4. A keyboard according to claim 3, wherein each of the contact areas comprises silver ink.

5. A self-service terminal comprising:

a card reader for receiving a user identifying card from a user; and a keyboard for allowing a user to input data when the card reader receives a user identifying card from the user, the keyboard including (i) an array of movable keys, (ii) a flexible membrane layer adjacent the keys and including first and second outer layers separated by an inner layer having a multiplicity of interconnected voids, (iii) means defining a venting aperture through which air in the interconnected voids of the inner layer can be vented to the atmosphere, (iv) an array of operable switches corresponding to the array of movable keys such that movement of a key operates a corresponding switch which results in passing of air from the interconnected voids through the venting aperture to the atmosphere, and (v) a liquid resistant gas permeable layer overlying the venting aperture and for preventing liquid from entering through the venting aperture to the interconnected voids of the inner layer and for allowing air to pass from the interconnected voids through the venting aperture to the atmosphere when a switch operates in response to movement of the corresponding key.

6. A self-service terminal according to claim 5, wherein the liquid resistant gas permeable layer comprises a hydrophobic material.

7. A self-service terminal according to claim 5, wherein each switch includes a contact area on the first outer layer and a contact area on the second outer layer, the contact areas on the first and second outer layers making contact when the key corresponding to the switch is pressed.

8. A self-service terminal according to claim 7, wherein each of the contact areas comprises silver ink.

9. Keyboard according to claim 1, wherein the venting aperture comprises a hole (52), centrally positioned in one of the outer layers.

10. Keyboard according to claim 1, wherein the venting aperture is contained in one of the outer layers.

11. Keyboard according to claim 1, wherein the inner layer contains a periphery which cooperates with the outer layers to seal the interconnected voids from the atmosphere.

* * * * *

UNITED STATES PATENT AND TRADEMARK OFFICE

CERTIFICATE OF CORRECTION

PATENT NO. : 5,969,320

DATED : October 19, 1999

INVENTOR(S) : Kevin G. Leeper et al.

It is certified that error appears in the above-indentified patent and that said Letters Patent is hereby corrected as shown below:

Title Page, Line [54], delete "KEYBOARD" and insert -- A KEYBOARD HAVING LIQUID RESISTANT GAS PERMEABLE LAYER AND VENTING APERTURE --.

Signed and Sealed this

Twenty-seventh Day of March, 2001

*Attest:*

Nicholas P. Godici

NICHOLAS P. GODICI

*Attesting Officer*

*Acting Director of the United States Patent and Trademark Office*